US008723070B2

(12) United States Patent
Yoshida et al.

(10) Patent No.: US 8,723,070 B2
(45) Date of Patent: May 13, 2014

(54) POWER SWITCHGEAR

(75) Inventors: Satoru Yoshida, Chiyoda-ku (JP);
Tomotaka Yano, Chiyoda-ku (JP);
Masahiro Arioka, Chiyoda-ku (JP);
Koji Sano, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 225 days.

(21) Appl. No.: 13/508,911

(22) PCT Filed: Sep. 16, 2010

(86) PCT No.: PCT/JP2010/066056
§ 371 (c)(1),
(2), (4) Date: May 9, 2012

(87) PCT Pub. No.: WO2011/104915
PCT Pub. Date: Sep. 1, 2011

(65) Prior Publication Data
US 2012/0228267 A1    Sep. 13, 2012

(30) Foreign Application Priority Data

Feb. 23, 2010  (JP) .................................. 2010-037189

(51) Int. Cl.
*H01H 33/666*     (2006.01)
(52) U.S. Cl.
USPC ............................ 218/134; 218/118; 218/155
(58) Field of Classification Search
USPC .......................................... 218/118, 134, 155
See application file for complete search history.

(56) References Cited

U.S. PATENT DOCUMENTS

| 6,784,392 | B1 * | 8/2004 | Piazza et al. ....................... 218/7 |
| 7,511,243 | B2 * | 3/2009 | Laskowski et al. ............... 218/7 |
| 8,110,770 | B2 * | 2/2012 | Ichikawa et al. ............. 218/134 |
| 2005/0236371 | A1 * | 10/2005 | Cameroni et al. ............ 218/118 |
| 2007/0151953 | A1 * | 7/2007 | Meinherz ....................... 218/155 |
| 2010/0288733 | A1 | 11/2010 | Ichikawa et al. |

FOREIGN PATENT DOCUMENTS

| JP | 53-064256 U | 5/1978 |
| JP | 59-12440 U | 1/1984 |
| JP | 59-086406 A | 5/1984 |
| JP | 59-149352 U | 10/1984 |

(Continued)

OTHER PUBLICATIONS

International Search Report (PCT/ISA/210) issued on Nov. 9, 2010, by the Japanese Patent Office as the International Searching Authority for International Application No. PCT/JP2010/066056.

(Continued)

*Primary Examiner* — Truc Nguyen
(74) *Attorney, Agent, or Firm* — Buchanan Ingersoll & Rooney PC

(57) ABSTRACT

A power switchgear according to the present invention includes a pass-through hole which is formed in a fixed side contact case that is supported by a fixed side insulation supporter to fix and retain the fixed side of a vacuum valve and has a larger inner diameter than an outer diameter of the vacuum valve so that the vacuum valve is capable of horizontally passing through and the fixed side end portion of the vacuum valve is placed by passing through; and a fixed side connection conductor attached to the fixed side contact case and connected to the fixed side end portion of the vacuum valve.

11 Claims, 6 Drawing Sheets

(56) References Cited

FOREIGN PATENT DOCUMENTS

| | | |
|---|---|---|
| JP | 2003-319515 A | 11/2003 |
| JP | 2007-306701 A | 11/2007 |
| KR | 10-2009-0009778 A | 1/2009 |

OTHER PUBLICATIONS

Office Action dated Apr. 30, 2013, issued by the Korean Patent Office in the corresponding Korean Patent Application No. 10-2012-7013183, and an English translation thereof. (5 pages).

* cited by examiner

POWER SWITCHGEAR

TECHNICAL FIELD

The present invention relates to a power switchgear equipped with a tank type vacuum circuit breaker for use in electric power transmission/distribution and reception facilities and the like and, more particularly, relates to a support structure of a vacuum valve in the tank type vacuum circuit breaker.

BACKGROUND ART

For example, FIG. 7 is known as a conventional power switchgear equipped with a tank type vacuum circuit breaker. FIG. 7 is a longitudinal sectional view showing a conventional power switchgear disclosed in Patent Document 1.

In FIG. 7, an operating mechanism or a connection mechanism to an operating mechanism is provided on one end of a ground tank 2 through a support plate 3. An insulation support tube 5 is supported to the support plate 3 on one horizontal end in the ground tank 2, and a support insulator 6 is supported on the other horizontal end in the ground tank 2. A conductive movable side contact case 8 is supported to an insulation support tube 5 through an insulation support 7. A fixed side contact case 9 is supported to the support insulator 6. A movable side end portion and a fixed side end portion of the vacuum valve 10 serving as an interruption portion are horizontally supported to the movable side contact case 8 and to the fixed side contact case 9, respectively. The operating mechanism or the connection portion of the operating mechanism, which is located outside the ground tank 2, is connected to a movable contact 11 of the vacuum valve 10 through an insulation operating rod 12 which passes through in the insulation support tube 5 and the insulation support 7.

Then, the movable contact 11 of the vacuum valve 10 passes through the movable side contact case 8; and a movable side conductor 35 and a fixed side conductor 15 are electrically connected to the movable side contact case 8 and the fixed side contact case 9, respectively, and each conductor is provided in an inclined state to be extended upward. The movable side conductor 35 and the fixed side conductor 15 are surrounded by a bushing 16 and a bushing 17, respectively; and the upper end of the movable side conductor 35 is provided with a bushing terminal 20 and the upper end of the fixed side conductor 15 is provided with a bushing terminal 21. (See Patent Document 1 and FIG. 2.)

Furthermore, in a power switchgear equipped with other conventional tank type vacuum circuit breaker shown in FIG. 8, in addition to the configuration of the aforementioned conventional power switchgear, electric field relaxation shields 24 and 25 are arranged in a mode where the movable side contact case 8, the fixed side contact case 9, and end portions of the vacuum valve 10 are surrounded for the purpose of electric field relaxation of electric fields of the movable side contact case 8, the fixed side contact case 9, and the end portions of the vacuum valve 10. (See Patent Document 2 and FIG. 1.)

Patent Document 1: Japanese Unexamined Patent Publication No. 2007-306701
Patent Document 2: Japanese Unexamined Patent Publication No. 2003-319515

DISCLOSURE OF THE INVENTION

Problems to be Solved by the Invention

In the aforementioned conventional power switchgear, the fixed side of the vacuum valve 10 is supported by the support insulator 6 through the fixed side contact case 9; and the fixed side conductor 15 disposed in an inclined state above the fixed side contact case 9 is inserted into inside the fixed side contact case 9.

Furthermore, the movable side of the vacuum valve 10 is supported through the movable side contact case 8, the insulation support 7, and the insulation support tube 5; and the movable side conductor 35 disposed in an inclined state above the movable side contact case 8 is inserted into inside the movable side contact case 8.

Further, the movable contact 11 of the vacuum valve 10 passes through in the insulation support 7 and the insulation support tube 5. For this reason, the vacuum valve 10 is structured to be sandwiched by the movable side contact case 8 and the fixed side contact case 9 and by the insulation support tube 5 and the support insulator 6; and therefore, problems exist in that installation of the vacuum valve 10 and connection to the operating mechanism or the connection portion of the operating mechanism, which is placed outside the ground tank 2, are difficult.

In addition, problems exist in that the attachment and detachment of the vacuum valve 10 is very difficult in a state where the movable side contact case 8 is connected to the movable side conductor 35 and the fixed side contact case 9 is connected to the fixed side conductor 15, the conductors being each inserted in an inclined manner from above, and the insulation support tube 5 or the support insulator 6 needs to be detached.

The present invention has been made to solve the problems described above, and an object of the present invention is to provide a power switchgear in which the entire power switchgear can be reduced in size and improvement of assembling workability of a vacuum valve and replacement of the vacuum valve can be achieved.

Means for Solving the Problems

According to the present invention, there is provided a power switchgear which includes: a ground tank whose axial direction is set horizontally; a vacuum valve horizontally placed in the ground tank and connected to an operating mechanism; a movable side insulation supporter placed in the ground tank and supported to the ground tank; a movable side contact case supported by the movable side insulation supporter to fix and retain the movable side of the vacuum valve; a fixed side insulation supporter placed in the ground tank and supported to the ground tank; a fixed side contact case supported by the fixed side insulation supporter to fix and retain the fixed side of the vacuum valve; a movable side terminal conductor in which one side passes through a wall portion of the ground tank and is connected to the movable side contact case, and the other side is disposed to be extended above the ground tank through a movable side bushing; and a fixed side terminal conductor in which one side passes through a wall portion of the ground tank and is connected to the fixed side contact case, and the other side is disposed to be extended above the ground tank through a fixed side bushing. The power switchgear includes: a pass-through hole which is formed in the fixed side contact case and has a larger inner diameter than the outer diameter of the vacuum valve so that the vacuum valve is capable of horizontally passing through and a fixed side end portion of the vacuum valve is placed by passing through; and a fixed side connection conductor attached to the fixed side contact case and connected to the fixed side end portion of the vacuum valve.

Advantageous Effect of the Invention

According to a power switchgear of the present invention, it is possible to obtain a power switchgear in which the entire power switchgear can be reduced in size, and improvement of assembling workability of a vacuum valve and replacement of the vacuum valve can be achieved.

MODE FOR CARRYING OUT THE INVENTION

Embodiment 1

Figure 1:
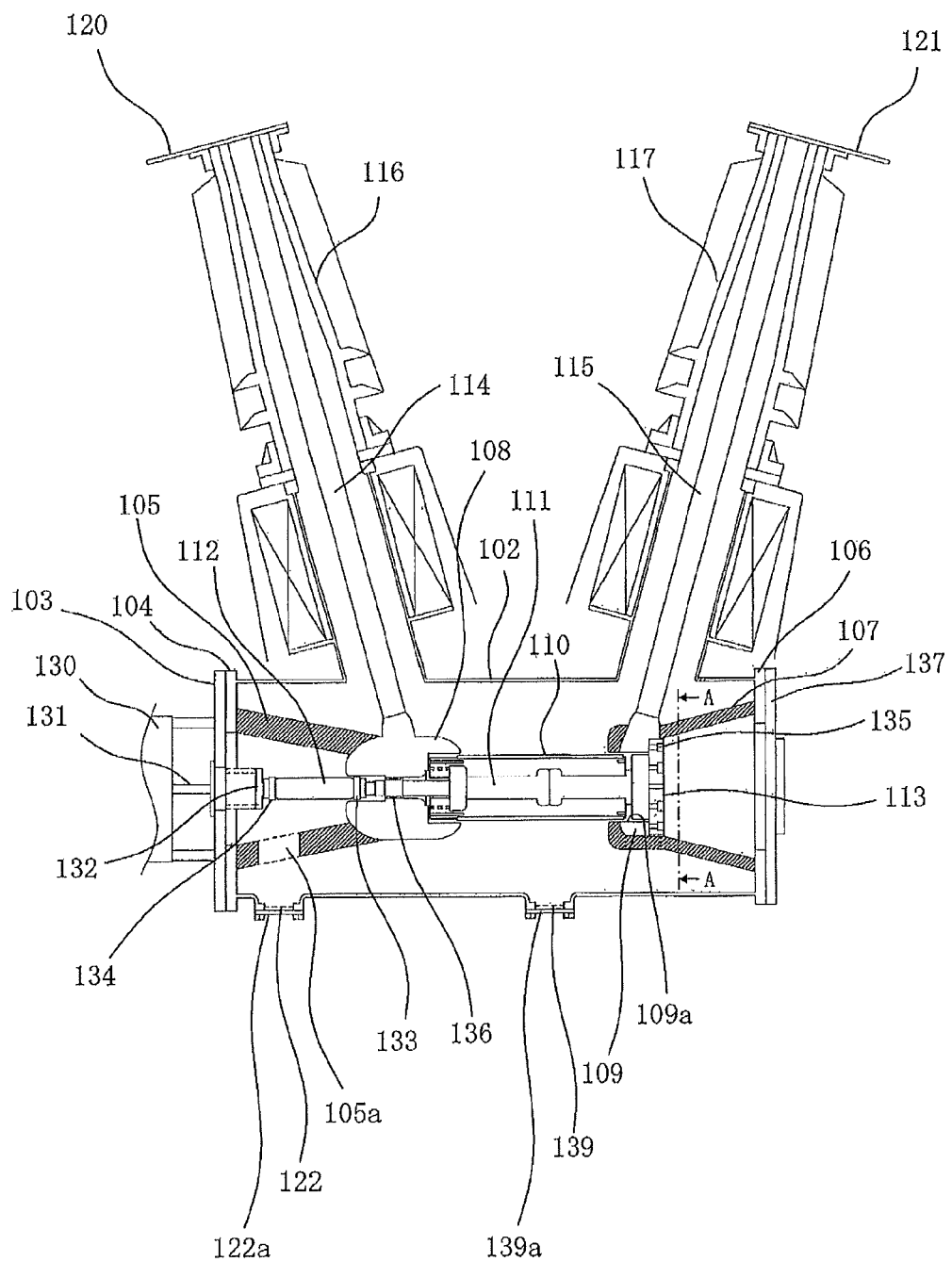
FIG. 1 is a longitudinal sectional view showing a power switchgear according to Embodiment 1 of the present invention.
Figure 2:
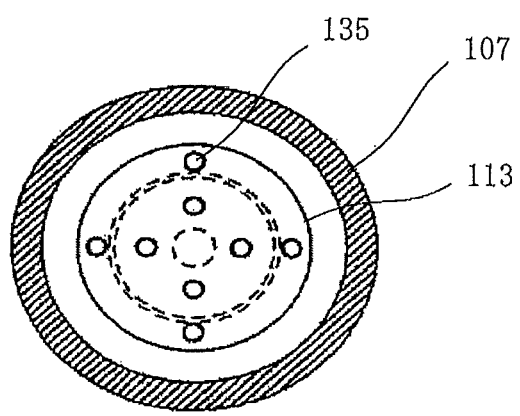
FIG. 2 is a sectional view taken along the line A-A shown in FIG. 1 showing the power switchgear according to Embodiment 1 of the present invention.

Hereinafter, Embodiment 1 of the present invention will be described with reference to FIG. 1 to FIG. 6. FIG. 1 is a longitudinal sectional view showing a power switchgear according to Embodiment 1 of the present invention. FIG. 2 is a sectional view taken along the line A-A shown in FIG. 1 showing the power switchgear according to Embodiment 1 of the present invention.

Figure 3:
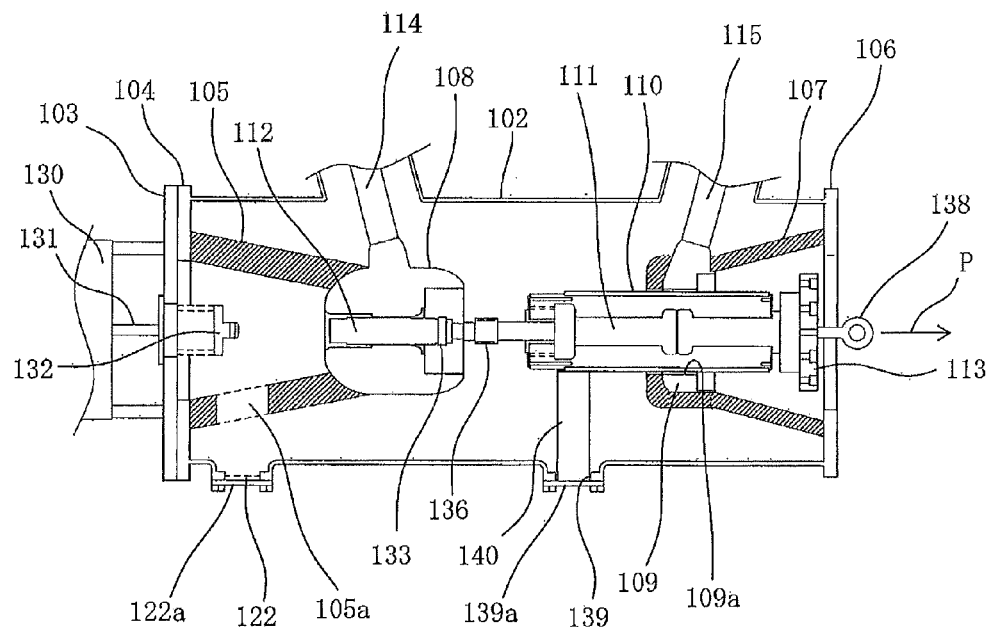
FIG. 3 is a longitudinal sectional view showing a state where a vacuum valve is being drawn in the power switchgear according to Embodiment 1 of the present invention.
Figure 4:
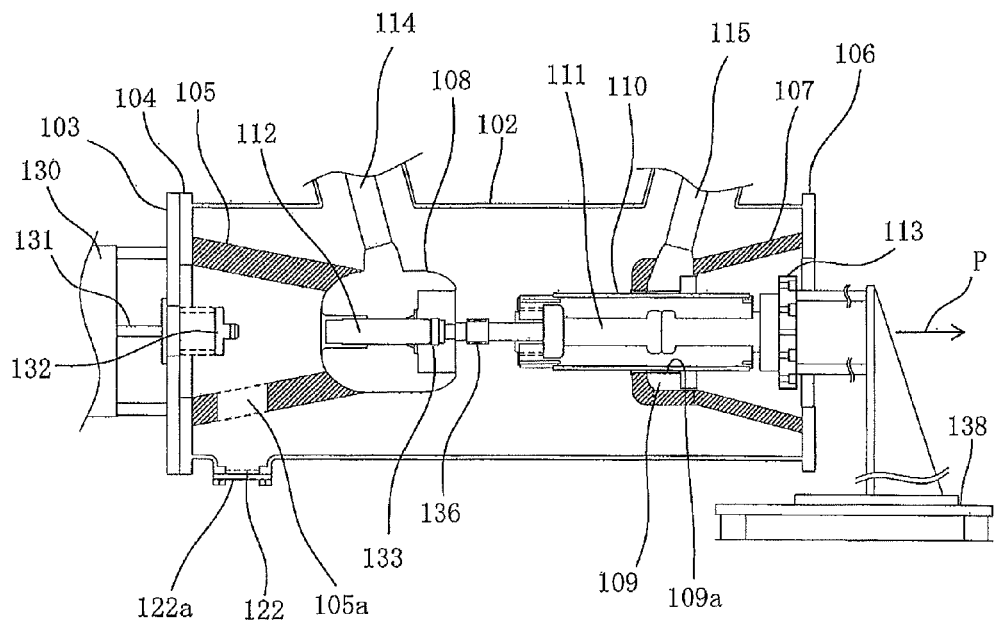
FIG. 4 is a longitudinal sectional view showing a state where the vacuum valve is being drawn in the power switchgear according to Embodiment 1 of the present invention.
Figure 5:
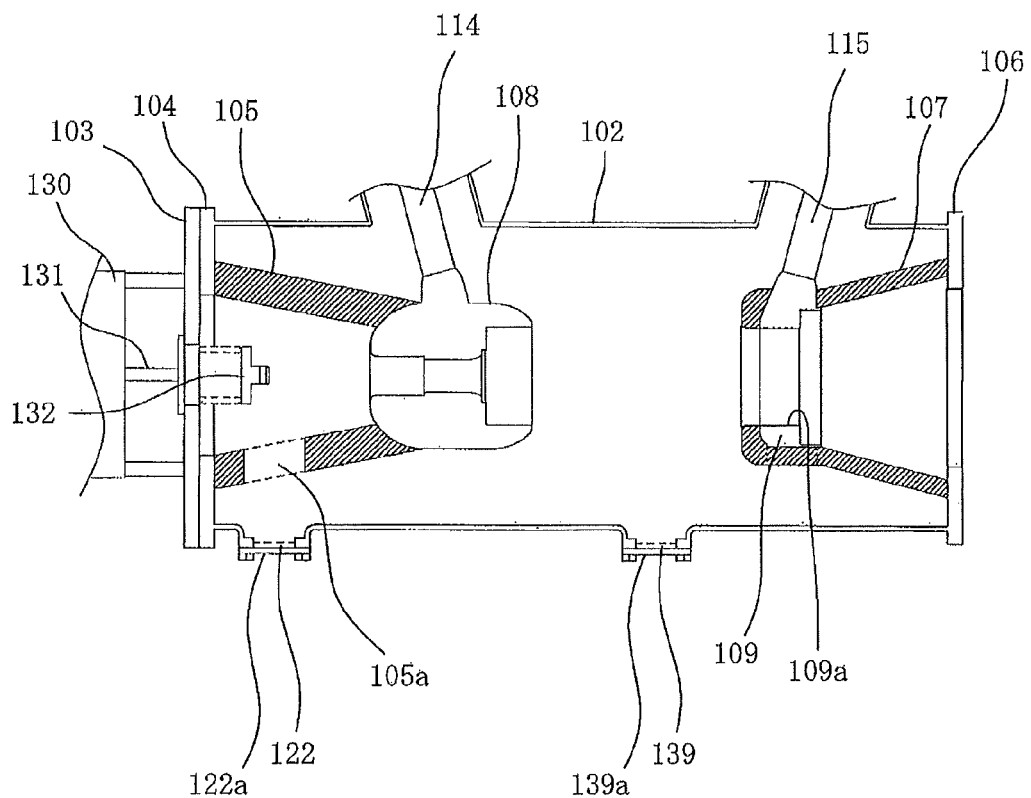
FIG. 5 is a longitudinal sectional view showing a state where the vacuum valve is detached in the power switchgear according to Embodiment 1 of the present invention.
Figure 6:
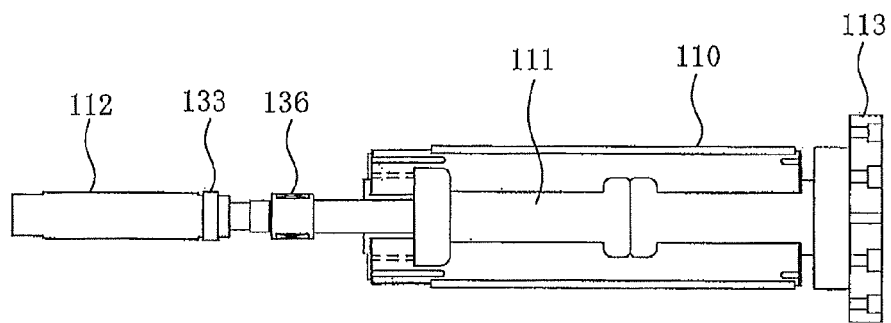
FIG. 6 is a longitudinal sectional view showing a configuration in the case of detaching the vacuum valve in the power switchgear according to Embodiment 1 of the present invention.
Figure 7:
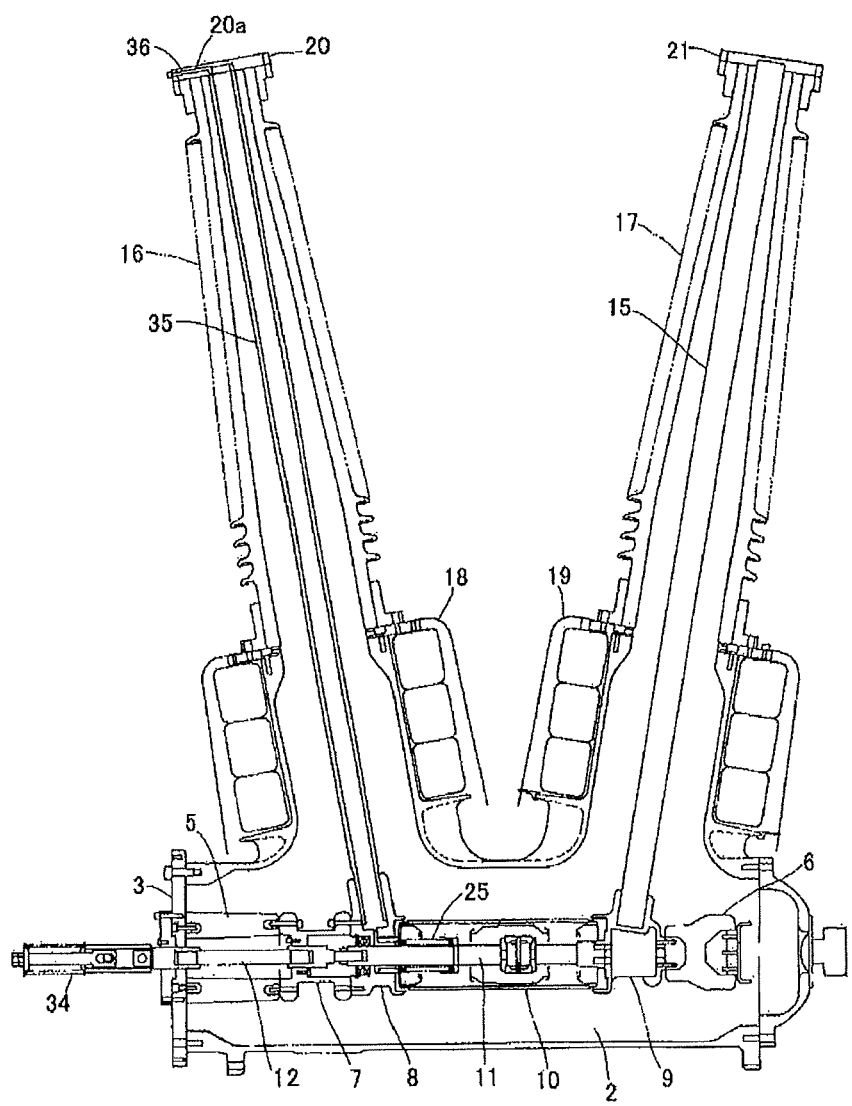
FIG. 7 is a longitudinal sectional view showing a conventional power switchgear.
Figure 8:
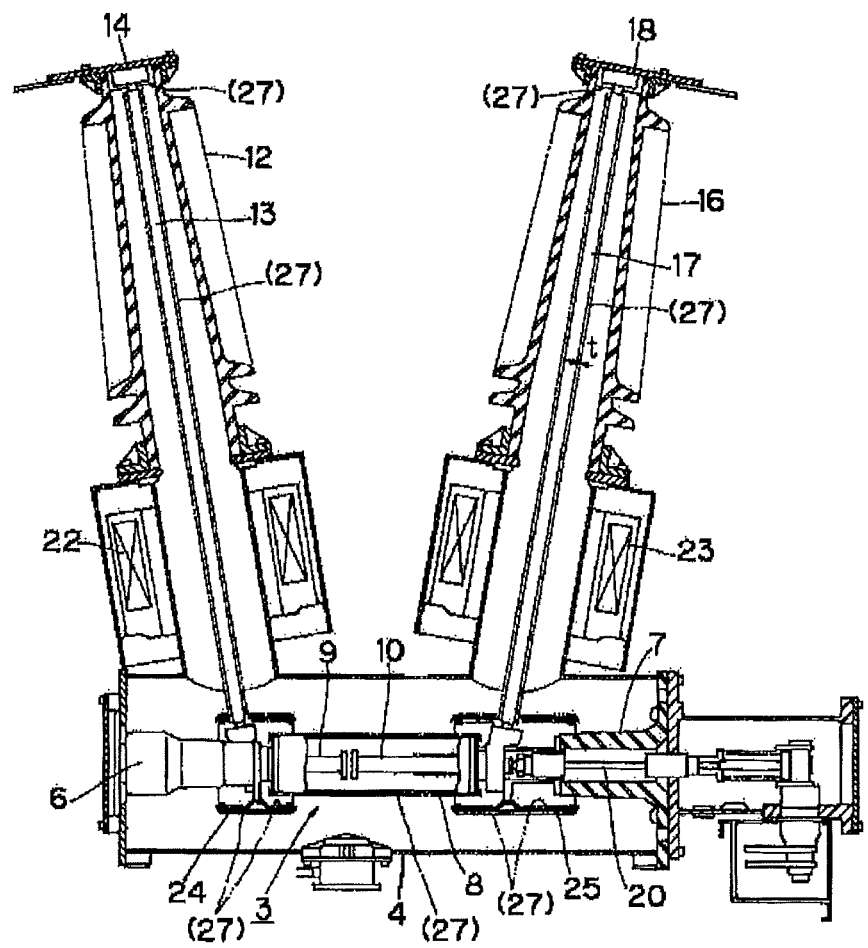
FIG. 8 is a longitudinal sectional view showing a conventional power switchgear.

FIG. 3 and FIG. 4 are longitudinal sectional views each showing a state where a vacuum valve is being drawn in the power switchgear according to Embodiment 1 of the present invention. FIG. 5 is a longitudinal sectional view showing a state where the vacuum valve is detached in the power switchgear according to Embodiment 1 of the present invention. FIG. 6 is a longitudinal sectional view showing a configuration in the case of detaching the vacuum valve in the power switchgear according to Embodiment 1 of the present invention.

In these respective drawings, an operating mechanism 130 or a connection mechanism 131 to the operating mechanism 130 is provided through a support plate 103 on a movable side end portion that is one horizontal end of aground tank 102 whose axial direction is set horizontally.

A conically and cylindrically shaped movable side insulation supporter 105 placed in the ground tank 102 is supported to a movable side support plate 104 on the movable side end portion that is one horizontal end of the ground tank 102. A conically and cylindrically shaped fixed side insulation supporter 107 placed in the ground tank 102 is supported to a fixed side support plate 106 on a fixed side end portion that is the other horizontal end of the ground tank 102. A cover 137 is attached on the outer side of the fixed side support plate 106.

A conductive movable side contact case 108 is supported by the movable side insulation supporter 105 to fix and retain the movable side of a vacuum valve 110. A conductive fixed side contact case 109 is supported in a molded state by the fixed side insulation supporter 107 to fix and retain the fixed side of the vacuum valve 110.

Further, a fixed side connection conductor 113 is fastened and connected to the fixed side contact case 9 with bolts 135 and the fixed side connection conductor 113 supports the fixed side end portion of the vacuum valve 110 serving as an interruption portion in a cantilevered state. The movable side end portion of the vacuum valve 110 is horizontally placed in the ground tank 102 and is to be connected to the operating mechanism 130 or the connection mechanism 131 of the operating mechanism 130.

As a result, the vacuum valve 110 is horizontally supported at the intermediate position between the movable side contact case 108 and the fixed side contact case 109 in a state where the vacuum valve 110 is supported to be cantilevered through the fixed side connection conductor 113 attached to an end portion of the fixed side contact case 109.

A connection portion 132 of the connection mechanism 131 of the operating mechanism 130 located outside the ground tank 102 and an insulation operating rod 112 which passes through the movable side insulation supporter 105 and the movable side contact case 108 are placed. The insulation operating rod 112 is connected to a movable side contact conductor 111 of the vacuum valve 110 through a connecting pin 133 and the insulation operating rod 112 is connected to the connection portion 132 of the connection mechanism 131 of the operating mechanism 130 through a connecting pin 134, the connecting pins 133, 134 being provided on both sides of the insulation operating rod 112.

Furthermore, the movable side contact case 108 comes into contact with the movable side contact conductor 111 of the vacuum valve 110 in a slidable state by a slide contact 136 placed on the outer circumference of an extended portion of the movable side contact conductor 111.

One side of a movable side terminal conductor 114 is electrically connected to the movable side contact case 108 placed in the ground tank 102, and the other side of the movable side terminal conductor 114 is disposed to be extended above the ground tank 102 through a movable side bushing 116. The movable side terminal conductor 114 is surrounded by the movable side bushing 116 to maintain insulation properties.

One side of a fixed side terminal conductor 115 is electrically connected to the fixed side contact case 109 which is supported by the fixed side insulation supporter 107 placed in the ground tank 102, and the other side of the fixed side terminal conductor 115 is disposed to be extended above the ground tank 102. The fixed side terminal conductor 115 is surrounded by a fixed side bushing 117 to maintain insulation properties.

A work window 122 which is for confirming the connection portion between the operating mechanism 130 and the vacuum valve 110, that is, the connection portion 132 to the insulation operating rod 112 or for attaching and detaching the connecting pin 134 is formed in the lower surface of a wall portion of the ground tank 102.

A work port 105a which is for performing the attachment and detachment work of the connecting pin 134 of the connection portion 132 is formed at a portion facing the work window 122 of the movable side insulation supporter 105.

A pass-through hole 109a is provided in the axial direction of the vacuum valve 110, the pass-through hole 109a being formed in the inner diameter side of the fixed side contact case 109 and having a larger inner diameter dimension than an outer diameter dimension of the vacuum valve 110 so that the vacuum valve 110 is capable of horizontally passing through and the fixed side end portion of the vacuum valve 110 is placed by passing through.

The fixed side connection conductor 113, which is fastened and connected with the bolts 135 to the fixed side contact case 109 supported in a molded state by the fixed side insulation supporter 107, is connected to the fixed side end portion of the vacuum valve 110; and attachment and detachment can be made with respect to the fixed side contact case 109 in a state where the vacuum valve 110 is connected.

The movable side contact case 108 and the fixed side contact case 109 are supported by the movable side insulation supporter 105 and the fixed side insulation supporter 107, respectively; and therefore, the vacuum valve 110 can be horizontally drawn or inserted without detaching the movable side conductor 114 and the fixed side conductor 115, which are each connected in a mode to be inserted in an inclined state from above.

Next, drawing work of the vacuum valve 110 will be described with reference to FIG. 3. A cover member 122a of the work window 122 formed in the lower surface of the wall portion of the ground tank 102 is detached, and the connecting pin 134 of the connection portion 132 to the insulation operating rod 112 is detached through the work port 105a of the movable side insulation supporter 105.

The cover 137 attached on the outside of the fixed side support plate 106 on the other horizontal end of the ground tank 102 is detached, and the fixed side connection conductor 113 is detached from the fixed side contact case 109. Then, a detaching bracket 138 is attached to the fixed side connection conductor 113 to be drawn in a direction of a horizontal arrow P.

Furthermore, in the case of drawing or inserting the vacuum valve 110, a cover member 139a of a work port 139 is detached and a support body 140 which is for supporting an outer circumferential portion of the vacuum valve 110 from below is inserted to be disposed so as to support the outer circumferential portion of the vacuum valve 110 from below. The support body 140 is provided; and accordingly, the drawing or inserting of the vacuum valve 110 can be horizontally and stably performed.

Alternatively, as shown in FIG. 4, the detaching bracket 138 is made in a carriage shape; and accordingly, the drawing or inserting of the vacuum valve 110 can be stably performed without providing the work port 139 and the support body 140.

FIG. 5 shows a state where the drawing of the vacuum valve 110 is completed. As described above, in this Embodiment 1, the pass-through hole 109a is provided in the axial direction of the vacuum valve 110, the pass-through hole 109a being formed in the inner diameter side of the fixed side contact case 109 and having the larger inner diameter dimension than the outer diameter dimension of the vacuum valve 110 so that the vacuum valve 110 is capable of horizontally passing through and the fixed side end portion of the vacuum valve 110 is placed by passing through; and accordingly, the fixed side of the vacuum valve 110 passes through the pass-through hole 109a of the fixed side contact case 109 to be able to be fixed and retained and the vacuum valve 110 can be horizontally retained.

Furthermore, in the case of drawing work of the vacuum valve 110, the cover member 122a of the work window 122 formed in the lower surface of the wall portion of the ground tank 102 is detached and the connecting pin 134 of the connection portion 132 to the insulation operating rod 112 is detached through the work port 105a of the movable side insulation supporter 105; and accordingly, the connection to the operating mechanism 130 is released. Then, the cover 137 is detached, the fixed side connection conductor 113 is detached from the fixed side contact case 109, the detaching bracket 138 is attached to the fixed side connection conductor 113, and the vacuum valve 110 is made to pass through in the pass-through hole 109a of the fixed side contact case 109 to be drawn in the direction of the horizontal arrow P; and therefore, the vacuum valve 110 can be horizontally drawn or inserted without detaching the movable side conductor 114 and the fixed side conductor 115, which are each connected in a mode to be inserted in an inclined state from above, and the fixed side insulation supporter 107. As a result, the entire power switchgear can be reduced in size, and improvement of assembling workability of the vacuum valve 110 and replacement of the vacuum valve 110 at site can be achieved.

Further, in the mode shown in FIG. 3, the support body 140 which is for supporting the outer circumferential portion of the vacuum valve 110 from below and the work port 139 which is for inserting the support body 140 into the ground tank 102 are provided; and accordingly, the drawing or inserting of the vacuum valve 110 can be horizontally and stably performed.

In addition, the vacuum valve 110 may be configured to be capable of separating from the movable side contact case 108 so that the vacuum valve 110 is horizontally drawn in a direction to the fixed side end portion.

INDUSTRIAL APPLICABILITY

The present invention is suitable to actualize a power switchgear in which the entire vacuum circuit breaker can be reduced in size, and improvement of assembling workability of the vacuum valve and replacement of the vacuum valve can be achieved.

The invention claimed is:
1. A power switchgear comprising:
a ground tank whose axial direction is set horizontally;
a vacuum valve horizontally placed in said ground tank and connected to an operating mechanism;
a movable side insulation supporter placed in said ground tank and supported to said ground tank;
a movable side contact case supported by said movable side insulation supporter to fix and retain the movable side of said vacuum valve;
a fixed side insulation supporter placed in said ground tank and supported to said ground tank;
a fixed side contact case supported by said fixed side insulation supporter to fix and retain the fixed side of said vacuum valve;
a movable side terminal conductor in which one side passes through a wall portion of said ground tank and is connected to said movable side contact case, and the other side is disposed to be extended above said ground tank through a movable side bushing; and
a fixed side terminal conductor in which one side passes through a wall portion of said ground tank and is connected to said fixed side contact case, and the other side is disposed to be extended above said ground tank through a fixed side bushing,
said power switchgear including: a pass-through hole which is formed in said fixed side contact case and has a larger inner diameter than the outer diameter of said vacuum valve so that said vacuum valve is capable of horizontally passing through and a fixed side end portion of said vacuum valve is placed by passing through; and a fixed side connection conductor attached to said fixed side contact case and connected to the fixed side end portion of said vacuum valve.

2. The power switchgear according to claim 1, wherein said vacuum valve is horizontally supported by only said fixed side insulation supporter through said fixed side contact case.

3. The power switchgear according to claim 1, wherein the connection between said vacuum valve and said operating mechanism is released and said fixed side connection conductor is detached from said fixed side contact case, whereby said vacuum valve is made to pass through the pass-through hole of said fixed side contact case to be drawn from said ground tank.

4. The power switchgear according to claim 2, wherein the connection between said vacuum valve and said operating mechanism is released and said fixed side connection conductor is detached from said fixed side contact case, whereby said vacuum valve is made to pass through the pass-through hole of said fixed side contact case to be drawn from said ground tank.

5. The power switchgear according to claim 1, wherein the wall portion of said ground tank is formed with a work window which is for confirming or attaching and detaching the connection portion between said operating mechanism and said vacuum valve.

6. The power switchgear according to claim 2, wherein the wall portion of said ground tank is formed with a work window which is for confirming or attaching and detaching the connection portion between said operating mechanism and said vacuum valve.

7. The power switchgear according to claim 1, further comprising a support body to be placed to support an outer circumferential portion of said vacuum valve from below when said vacuum valve is drawn or inserted.

8. The power switchgear according to claim 2, further comprising a support body to be placed to support an outer circumferential portion of said vacuum valve from below when said vacuum valve is drawn or inserted.

9. The power switchgear according to claim 7, wherein the lower side of the wall portion of said ground tank is formed with a work window through which said support body is attached, said support body being for supporting the outer circumferential portion of said vacuum valve from below.

10. The power switchgear according to claim 8, wherein the lower side of the wall portion of said ground tank is formed with a work window through which said support body is attached, said support body being for supporting the outer circumferential portion of said vacuum valve from below.

11. A power switchgear comprising:
a ground tank whose axial direction is set horizontally;
a vacuum valve horizontally placed in said ground tank and connected to an operating mechanism;
a movable side insulation supporter placed in said ground tank and supported to said ground tank;
a movable side contact case supported by said movable side insulation supporter to fix and retain the movable side of said vacuum valve;
a fixed side insulation supporter placed in said ground tank and supported to said ground tank;
a fixed side contact case supported by said fixed side insulation supporter to fix and retain the fixed side of said vacuum valve;
a movable side terminal conductor in which one side passes through a wall portion of said ground tank and is connected to said movable side contact case, and the other side is disposed to be extended above said ground tank through a movable side bushing; and
a fixed side terminal conductor in which one side passes through a wall portion of said ground tank and is connected to said fixed side contact case, and the other side is disposed to be extended above said ground tank through a fixed side bushing,
wherein said vacuum valve is configured to be capable of separating from said movable side contact case, and
said vacuum valve is horizontally drawn in a direction to a fixed side end portion.

* * * * *